US012728668B2

(12) United States Patent
Wang

(10) Patent No.: US 12,728,668 B2
(45) Date of Patent: Sep. 8, 2026

(54) SAFETY HUB AGAINST TIRE BURST

(71) Applicant: Shenzhen Antelun Intelligent Technology Co., Ltd, Shenzhen (CN)

(72) Inventor: Baohua Wang, Xuchang (CN)

(73) Assignee: Shenzhen Antelun Intelligent Technology Co., Ltd, Shenzhen (CN)

( * ) Notice: Subject to any disclaimer, the term of this patent is extended or adjusted under 35 U.S.C. 154(b) by 305 days.

(21) Appl. No.: 18/290,812

(22) PCT Filed: Jun. 29, 2023

(86) PCT No.: PCT/CN2023/103530
§ 371 (c)(1),
(2) Date: Jan. 22, 2024

(87) PCT Pub. No.: WO2024/007927
PCT Pub. Date: Jan. 11, 2024

(65) Prior Publication Data

US 2024/0343064 A1 Oct. 17, 2024

(30) Foreign Application Priority Data

Jul. 4, 2022 (CN) ......................... 202221702322.7

(51) Int. Cl.
*B60B 21/12* (2006.01)
*B60B 21/10* (2006.01)
(Continued)

(52) U.S. Cl.
CPC .............. *B60B 21/12* (2013.01); *B60B 21/10* (2013.01); *B60C 15/0209* (2013.01); *B60C 15/0226* (2013.01); *B60B 21/023* (2013.01)

(58) Field of Classification Search
CPC ............ B60C 15/0209; B60C 15/0213; B60C 15/0226; B60C 17/04; B60C 17/048;
(Continued)

(56) References Cited

U.S. PATENT DOCUMENTS 4,042,003 A * 8/1977 Gaskill ............... B60C 15/0226 152/379.3
4,159,730 A * 7/1979 Osada ..................... B60C 17/04 152/158

(Continued)

FOREIGN PATENT DOCUMENTS

CN 110682731 A * 1/2020 ............. B60B 21/10
CN 213108852 U 5/2021

(Continued)

*Primary Examiner* — Kip T Kotter

(57) ABSTRACT

A safety hub against tire burst includes a hub body. The hub body includes an outer annular surface, a first side surface and a second side surface. The first side surface and the second side surface are oppositely arranged on two sides of the outer annular surface. The two sides of the outer annular surface are oppositely provided with a first wheel flange and a second wheel flange. A tire mounting seat is formed between the first wheel flange and the second wheel flange, and an anti-detachment collar is provided on the tire mounting seat. The anti-detachment collar is an annular protruding ring arranged along the outer annular surface. The anti-detachment collar is concentric with the outer annular surface. A surface of the anti-detachment collar is provided with a toothed structure which includes multiple protruding teeth and gullets. The protruding teeth and the gullets are alternately arranged.

7 Claims, 6 Drawing Sheets

(51) Int. Cl.
*B60C 15/02* (2006.01)
*B60B 21/02* (2006.01)

(58) Field of Classification Search
CPC ..... B60C 17/043; B60C 15/028; B60B 21/12; B60B 21/10; B60B 21/023
See application file for complete search history.

(56) References Cited

U.S. PATENT DOCUMENTS

| | | | | |
|---|---|---|---|---|
| 10,343,456 | B2 | 7/2019 | Novoplanski | |
| 11,273,677 | B2 | 3/2022 | Huang et al. | |
| 11,318,798 | B2 | 5/2022 | Meier et al. | |
| 2006/0086446 | A1* | 4/2006 | Ratet | B60C 15/028 152/400 |
| 2006/0096684 | A1* | 5/2006 | Heuze | B60B 21/12 152/381.6 |
| 2011/0298271 | A1* | 12/2011 | Cragg | B60B 3/16 301/95.101 |
| 2019/0275833 | A1* | 9/2019 | Stuck | B60B 3/00 |

FOREIGN PATENT DOCUMENTS

| | | | | | |
|---|---|---|---|---|---|
| CN | 217396108 | U | | 9/2022 | |
| DE | 3809422 | A1 | * | 10/1989 | B60C 15/028 |
| JP | H06312606 | A | * | 11/1994 | |
| WO | WO-2005068224 | A1 | * | 7/2005 | B60C 17/04 |

* cited by examiner

SAFETY HUB AGAINST TIRE BURST

CROSS-REFERENCE TO RELATED APPLICATIONS

This n is a 371 of International Patent Application No. PCT/CN2023/103530 with a filing date of Jun. 29, 2023, designating the United States, now pending, and further claims priority to Chinese Patent Application No. 202221702322.7, titled "SAFETY WHEEL AGAINST TIRE BURST", filed with the China National Intellectual Property Administration on Jul. 4, 2022, which is incorporated herein by reference in its entirety.

FIELD

The present application relates to the technical field of automobiles, and in particular to a safety wheel against tire burst.

BACKGROUND

If a tire, having no support of inner tube and sidewall, on one side of an automobile bursts, a rolling resistance of the burst tire will significantly increase. The rolling resistance is composed of three parts: tire deformation, road surface deformation, and friction between the tire and the road surface. The abruptly increased rolling resistance results in imbalance of force on the left and right sides of the automobile, thereby resulting in deviation and out-of-control.

During high-speed traveling, if one of the tires having no support of inner tube and sidewall suddenly bursts, it generally takes 2 to 3 seconds for the driver to react, and the automobile has already deviated significantly before the driver reacts. For example, the automobile may rush into an adjacent lane or an opposite lane. In this case, the driver may become nervous. Some drivers, due to excessive nervousness, may turn the steering wheel sharply to correct the deviation. If the driver turns the steering wheel sharply, the tire bead of the burst tire will detach from the tire bead seat of the rim and slide into the wheel groove of the rim, thus easily leading to landing of the rim of the wheel, resulting in drifting and out-of-control of braking and steering of the automobile, and finally resulting in traffic accidents and even serious traffic accidents such as rollover.

It can be seen that reducing the rolling resistance of the burst tire can reduce the degree of deviation of the automobile with burst tire. If the deviation of the automobile is small after the tire burst, the driver may not get too nervous, which can reduce or avoid the phenomenon of turning the steering wheel sharply, and reduce or prevent the tire bead from detaching from the tire bead seat of the rim and sliding into the wheel groove of the rim and prevent the resulting landing of the rim of the wheel, thus reducing the incidence of accidents after the tire burst.

A groove on the rim of the existing wheel is close to an outer structure of the rim, and an outer diameter of the groove is smaller than an inner diameter of a tire bead of a rubber tire. This groove with a smaller diameter allows the rubber tire to be mounted on the rim when the rubber tire is mounted. However, this groove also brings hidden dangers to tire burst of the automobile. If the automobile has a tire burst, the tire bead of the rubber tire directly detaches inwardly from the groove, so that the rubber tire and the rim cannot rotate synchronously, and thus the rim idly while the rubber tire is locked under the friction with the ground. Moreover, since the diameter of the burst rubber tire on one side (whether the left wheel or the right wheel) becomes much smaller, there is a large difference in traveling distance between the burst tire side and the other side, which causes the automobile to deviate towards the burst tire side, and may further cause traffic accidents.

Therefore, it is urgent to provide a new technical solution to solve the problems existing in the conventional technology.

SUMMARY

A safety wheel against tire burst is provided according to the present application, so as to solve the problem of deviation of the automobile caused by bead unseating in case of tire burst during high-speed traveling.

In order to achieve the above object, the following technical solutions are provided according to the present application.

A safety wheel against tire burst is provided according to the present application, which includes a rim body. The rim body includes an outer annular surface, a first side surface and a second side surface. The first side surface and the second side surface are oppositely arranged on two sides of the outer annular surface. A through hole for an automobile half shaft to pass through is defined on the second side surface, and a connecting seat adapted to the automobile half shaft is formed on the first side surface.

The two sides of the outer annular surface are oppositely provided with a first wheel flange and a second wheel flange. A tire mounting seat is formed between the first wheel flange and the second wheel flange. An anti-detachment collar is provided on the tire mounting seat. The anti-detachment collar is an annular protruding ring arranged along the outer annular surface. The anti-detachment collar is concentric with the outer annular surface. A surface of the anti-detachment collar is provided with a toothed structure which includes multiple protruding teeth and gullets. The protruding teeth and the gullets are alternately arranged. The protruding teeth are protrusions extending outward from the surface of the anti-detachment collar, and the gullets are grooves recessed inward from the surface of the anti-detachment collar. The outside diameter of the protruding teeth is greater than the diameter of a tire bead adapted to the tire mounting seat.

Based on the above technical solution, further, the first wheel flange is located on the first side surface, the second wheel flange is located on the second side surface, and the automobile half shaft is directed through the second side surface and connected with the center of the first side surface.

Further, the anti-detachment collar is close to the first wheel flange, a first tire bead seat is formed between the anti-detachment collar and the first wheel flange, and the diameter of the first tire bead seat is smaller than the diameter of the surface of the anti-detachment collar.

Further, a first protruding ring is provided on the outer annular surface of the rim body. The first protruding ring is close to the second wheel flange, and a second tire bead seat is formed between the first protruding ring and the second wheel flange. The first tire bead seat and the second tire bead seat are symmetrically arranged with a centerline of a nominal width of the rim body as a symmetry axis. The diameter of the first tire bead seat is equal to the diameter of the second tire bead seat.

Further, a rim outer grooved surface is formed between the first protruding ring and the anti-detachment collar.

Further, the anti-detachment collar is close to the second wheel flange, and a mounting seat for mounting the tire bead on one side of the tire is formed between the anti-detachment collar and the second wheel flange. The diameter of the mounting seat for mounting the tire bead on one side of the tire is smaller than the diameter of the surface of the anti-detachment collar.

Further, two anti-detachment collars, namely first anti-detachment collar and second anti-detachment collar, are oppositely provided on the tire mounting seat. The first anti-detachment collar is close to the first wheel flange, and a first mounting seat for mounting the tire bead on one side of the tire is formed between the first anti-detachment collar and the first wheel flange. The second anti-detachment collar is close to the second wheel flange, and a second mounting seat for mounting the tire bead on the other side of the tire is formed between the second anti-detachment collar and the second wheel flange. The diameter of the mounting seat for mounting the tire bead of the tire is smaller than the diameter of the surface of the anti-detachment collar.

Further, the protruding teeth are arranged on a side, close to the rim outer grooved surface, of the anti-detachment collar. Each gullet is a groove with one open end, and the open end of the gullet faces towards the rim outer grooved surface.

Further, the inner diameter of the bottom of the gullets is smaller than the diameter of the first tire bead seat.

Further, the multiple protruding teeth and the gullets are uniformly arranged on the surface of the anti-detachment collar.

Further, a second protruding ring, a third protruding ring and a grooved ring arranged between the second protruding ring and the third protruding ring are provided on the rim outer grooved surface. The second protruding ring is adjacent to the anti-detachment collar. The second protruding ring is smoothly connected to the anti-detachment collar via a first transition ring, and the first transition ring is a sloped ring. The diameter of the second protruding ring is smaller than the inner diameter of the bottom of the gullets.

The third protruding ring is adjacent to the first protruding ring, and the third protruding ring is a sloped ring. The first protruding ring is smoothly connected to the grooved ring via the third protruding ring, and the diameter of the first protruding ring is greater than the maximum diameter of the grooved ring.

Further, the grooved ring includes a second transition ring and a third transition ring. The second transition ring and the third transition ring are sloped rings. The junction between the second transition ring and the third transition ring forms the minimum diameter of the grooved ring. The maximum diameter of the second transition ring is equal to the maximum diameter of the third transition ring.

Further, the junction between the second transition ring and the third transition ring is located on the centerline of the nominal width of the rim body.

Further, the outside diameter of the first wheel flange is equal to the outside diameter of the second wheel flange, and the outside diameter of the protruding teeth is smaller than the outside diameter of the first wheel flange.

Further, the rim body includes multiple spokes radially arranged on the first side surface. The connecting seat adapted to the automobile half shaft is formed at the center of the multiple spokes, and multiple mounting through holes are defined on the connecting seat.

Further, the multiple spokes are strip-shaped, one end of each spoke is connected with the connecting seat, and the other end of each spoke is connected with the first wheel flange.

Compared with the conventional technology, the present application has the following beneficial effects.

The safety wheel against tire burst according to the present application is provided with an anti-detachment collar, and the anti-detachment collar is provided with a toothed structure which can lock the tire so that the tire can rotate following the rim. The toothed structure includes multiple protruding teeth and gullets which are alternately arranged. The outside diameter of the protruding teeth is greater than the diameter of the tire bead of the tire adapted to the tire mounting seat. If the tire with the safety wheel against tire burst according to the present application is burst, the tire bead of the tire (which may be a rubber tire) will fall directly from the first tire bead seat to the anti-detachment collar. The protruding teeth on the anti-detachment collar can lock the tire, and support the tire bead of the tire, so that the burst tire can continue to rotate following the rim, which greatly reduces the difference in rotation traveling distance between the left and right wheels and reduces the amplitude of deviation of the automobile. Therefore, the automobile can maintain its direction under tire burst, and the driver is allowed to slow down and brake calmly, thereby effectively avoiding various problems caused by the tire burst during high-speed traveling, reducing the incidence of accidents caused by the tire burst of the automobile, and protecting the safety of drivers and passengers.

BRIEF DESCRIPTION OF THE DRAWINGS

In order to illustrate technical solutions in embodiments of the present application more clearly, drawings to be used in the embodiments are briefly introduced hereinafter. Apparently, the drawings described below illustrate only some embodiments of the present application, and other drawings may be obtained by those skilled in the art from the drawings disclosed herein without any creative effort. It should be understood that the specific shapes and structures shown in the drawings generally should not be considered as limiting conditions for realizing the preset application. For example, based on the technical concepts and exemplary drawings disclosed in the present application, those skilled in the art are competent to easily make routine or the adjustments further optimizations on addition/subtraction/delimitation of combination, specific shape, positional relationship, connection method, and size proportional relationship, of some units (components).

Figure 1:
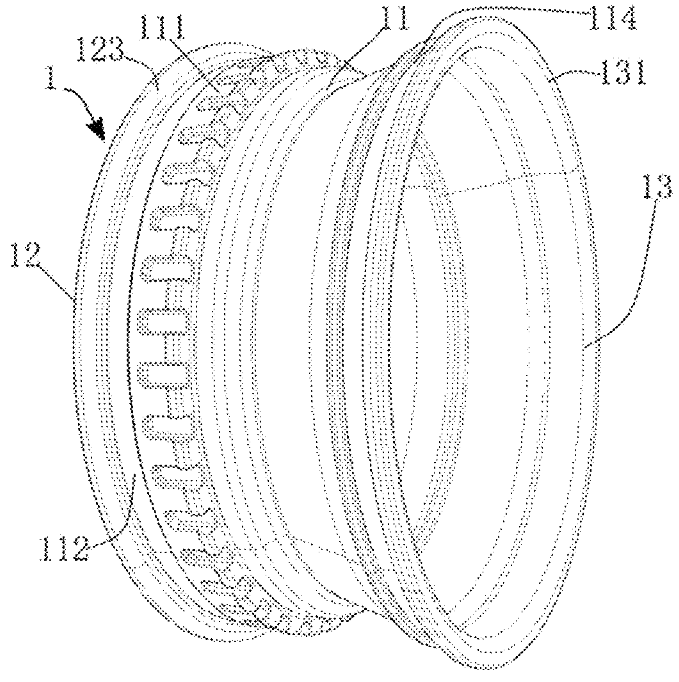
FIG. 1 is a schematic perspective view of a safety wheel against tire burst according to an embodiment of the present application, viewed from one perspective.

Reference numerals in the drawings are as follows:

1 rim body;

11 outer annular surface; 111 anti-detachment collar; 1111 protruding tooth; 1112 gullet; 112 first tire bead seat; 113 first protruding ring; 114 second tire bead seat; 115 second protruding ring; 116 third protruding ring; 117 first transition ring; 118 grooved ring; 1181 second transition ring; 1182 third transition ring;

12 first side surface; 121 connecting seat; 122 mounting through hole; 123 first wheel flange;

13 second side surface; 131 second wheel flange;

14 spoke.

DETAILED DESCRIPTION OF THE EMBODIMENTS

The present application will be further described in detail as follows through specific embodiments in conjunction with the accompanying drawings.

In the description of the present application, "multiple or a plurality of" means two or more unless otherwise stated. The terms "first", "second" and "third" used in the present application are intended to distinguish the objects referred to and do not have special significance in technical connotation (for example, should not be understood as emphasizing on importance or order). Expressions such as "including", "containing" and "having" also mean "not limited to" (some units, parts, materials, steps, etc.).

The terms used in the present application, such as "upper", "lower", "left", "right" and "middle", are generally for the convenience of intuitive understanding with reference to the accompanying drawings, and are not absolute limitations on the actual positional relationship in product. Without departing from the technical concept disclosed in the present application, these changes in relative positional relations should also be considered to be within the scope of the description of the present application.

The "nominal width of the rim body" mentioned in the present application refers to a straight-line distance between an outer edge of the first wheel flange and an outer edge of the second wheel flange.

A tire blowout accident is both accidental and unforeseeable. Once a tire burst occurs, the driver, due to lack of experience, often panic and make wrong operations, thus resulting in disastrous consequences. According to statistics, when the automobile is traveling at a high speed of 140 mph, the death rate of the tire burst accident is nearly 100%.

In order to prevent serious deviation of the automobile after tire burst, a safety wheel against tire burst is provided according to the present application, so as to solve the problem of deviation of the automobile caused by bead unseating in case of tire burst during high-speed traveling. The results of impact vibration tests and real automobile simulation tire burst tests show that the safety wheel against tire burst according to the present application can reduce the incidence of traffic accidents caused by tire burst by about 95% in terms of safety performance, and the tire burst safety standard requirements exceed the China national standard by about 30%, which can effectively reduce the incidence of accidents caused by the tire burst of automobile and protect the safety of drivers and passengers. The safety wheel against tire burst according to the present application has an integral structure, which is applicable to any motor vehicle, is easy to process and mount, and is convenient to use and maintain for the user.

First Embodiment

Referring to FIG. 1, a safety wheel against tire burst according to the present application includes a rim body 1. The rim body 1 has an outer annular surface 11, a first side surface 12 and a second side surface 13. The first side surface 12 and the second side surface 13 are oppositely arranged on two sides of the outer annular surface 11. In an embodiment, the first side surface 12 is an inwardly recessed surface recessed toward the second side surface 13. A through hole for an automobile half shaft to pass through is defined on the second side surface 13. A connecting seat 121 adapted to the automobile half shaft is formed on the first side surface 12. The automobile half shaft is directed through the second side surface 13 and is connected with the center of the first side surface 12.

Figure 2:
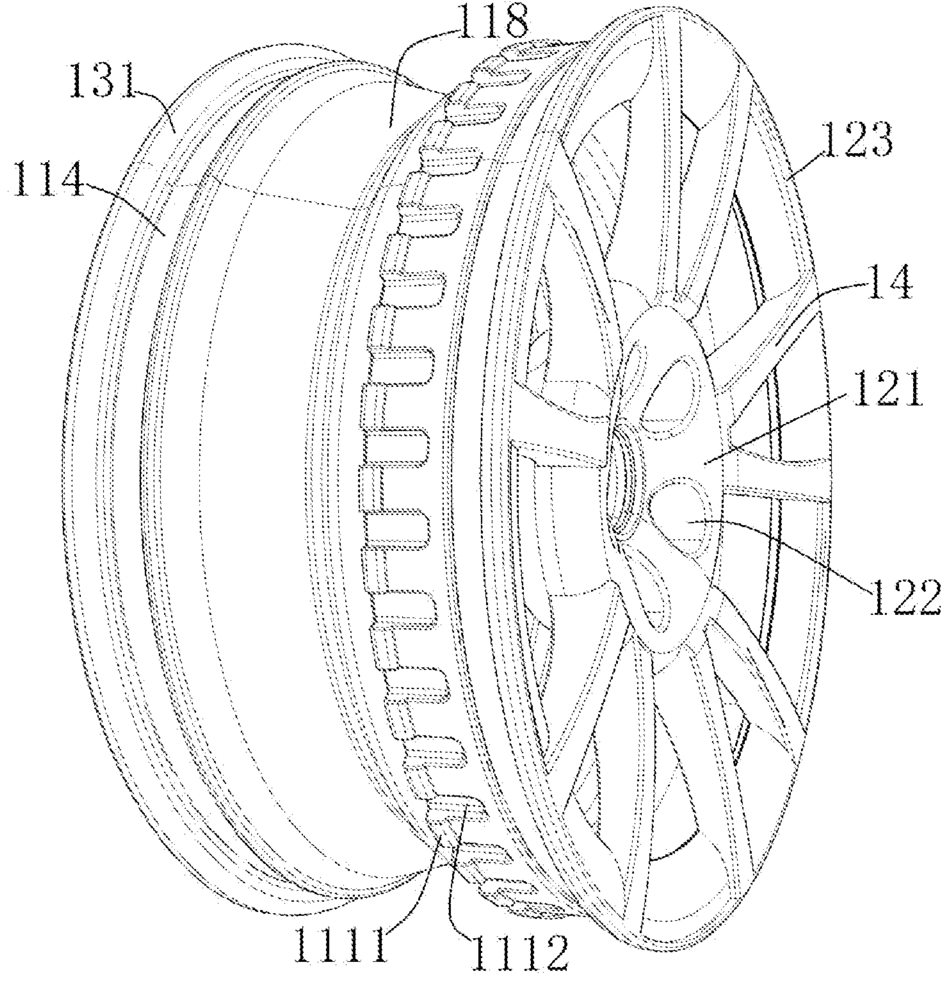
FIG. 2 is a schematic perspective view of the safety wheel against tire burst according to an embodiment of the present application, viewed from another perspective.

Referring to FIG. 2, the two sides of the outer annular surface 11 of the rim body 1 are oppositely provided with a first wheel flange 123 and a second wheel flange 131. A tire mounting seat is formed between the first wheel flange 123 and the second wheel flange 131. The diameter of the first wheel flange 123 is equal to the diameter of the second wheel flange 131. The diameter of the first wheel flange 123 or the diameter of the second wheel flange 131 is referred to as the nominal diameter of the rim body 1.

Figure 3:
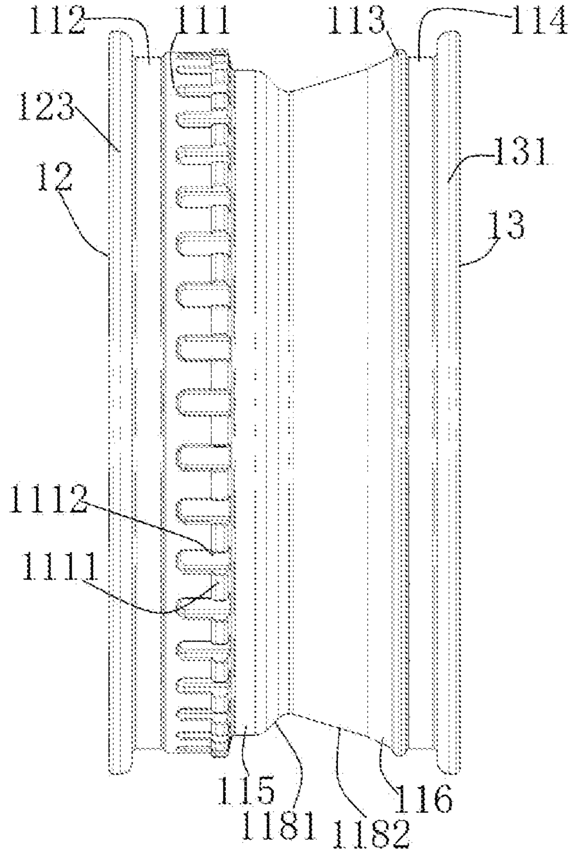
FIG. 3 is a schematic side view of the safety wheel against tire burst according to an embodiment of the present application.

In order to realize the support and positioning for the tire after tire burst, an anti-detachment collar 111 is provided on the tire mounting seat. Referring to FIG. 3, the anti-detachment collar 111 is an annular protruding ring arranged along the outer annular surface 11. The anti-detachment collar 111 is concentric with the outer annular surface 11. A surface of the anti-detachment collar 111 is provided with a toothed structure. The tooth-shaped structure includes multiple protruding teeth 1111 and gullets 1112. The protruding teeth 1111 and the gullets 1112 are alternately arranged. The protruding teeth 1111 are protrusions extending outward from the surface of the anti-detachment collar 111, and the gullets 1112 are grooves recessed inward from the surface of the anti-detachment collar 111. Referring to FIG. 3, the outside diameter of the protruding teeth 1111 is greater than the diameter of a tire bead adapted to the tire mounting seat. Therefore, if the tire bursts, the anti-detachment collar 111 on the rim body 1 according to the present application can support and lock the tire by means of the protruding teeth 1111 and the grooves on the anti-detachment collar 111. Especially, the protruding teeth 1111 can lock the tire. The burst tire is locked on the anti-detachment collar 111 and rotates synchronously with the rim, which can greatly reduce the difference in rotation traveling distance between the left and right wheels and reduce the amplitude of deviation of the automobile.

In an embodiment, the first wheel flange 123 is located on the first side surface 12, and the second wheel flange 131 is located on the second side surface 13. The anti-detachment collar 111 is close to the first wheel flange 123. A first tire bead seat 112 is formed between the anti-detachment collar 111 and the first wheel flange 123, and the diameter of the first tire bead seat 112 is smaller than the diameter of the surface of the anti-detachment collar 111.

A groove on the rim of the existing wheel is close to an outer structure of the rim, and an outer diameter of the groove is smaller than an inner diameter of a tire bead of a rubber tire. This groove with a smaller diameter allows the rubber tire to be mounted on the rim when the rubber tire is mounted. However, this groove also brings hidden dangers to tire burst of the automobile. If the automobile has a tire burst, the tire bead of the rubber tire directly detaches inwardly from the groove, so that the rubber tire and the rim cannot rotate synchronously, and thus the rim rotates idly while the rubber tire is locked under the friction with the ground. The anti-detachment collar 111 of the safety wheel against tire burst according to the present application is close to the first wheel flange 123 of the rim body 1. The first tire bead seat 112 is formed between the anti-detachment collar 111 and the first wheel flange 123, and the diameter of the first tire bead seat 112 is smaller than the diameter of the surface of the anti-detachment collar 111. If the tire bursts, the tire first detaches from the first tire bead seat 112 and is then locked on the anti-detachment collar 111, achieving emergent tire holding, so that the burst tire rotate synchronously with the rim, thereby reducing the amplitude of deviation of the automobile and improving safety.

Figure 5:
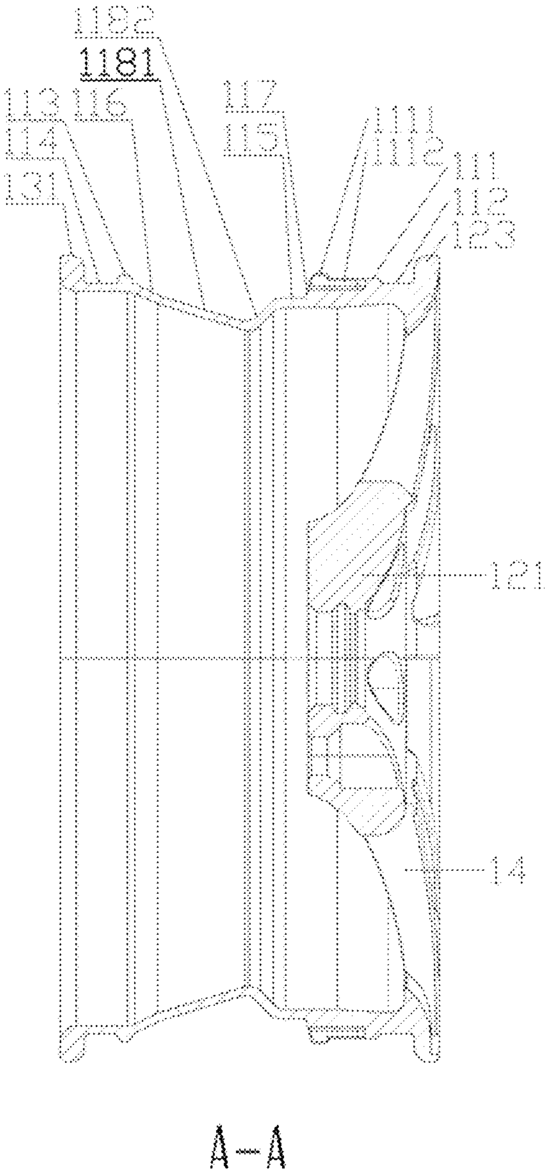
FIG. 5 is a schematic cross-sectional view of the safety wheel against tire burst taken along line A-A in FIG. 4.

In an embodiment, referring to FIG. 3 and FIG. 5, a first protruding ring 113 is provided on the outer annular surface 11 of the rim body 1. The first protruding ring 113 is close to the second wheel flange 131, and a second tire bead seat 114 is formed between the first protruding ring 113 and the second wheel flange 131. The first tire bead seat 112 and the second tire bead seat 114 are symmetrically arranged with a centerline of the nominal width of the rim body 1 as a symmetry axis. The diameter of the first tire bead seat 112 is equal to the diameter of the second tire bead seat 114. A rim outer grooved surface is formed between the first protruding ring 113 and the anti-detachment collar 111. One tire bead is provided on each of two sides of the tire, so that one tire bead is mounted inside each of the first tire bead seat 112 and the second tire bead seat 114 when the tire is mounted on the rim.

In an embodiment, referring to FIG. 3, the multiple protruding teeth 1111 and gullets 1112 are uniformly arranged on the surface of the anti-detachment collar 111. The protruding teeth 1111 are arranged on a side, close to the rim outer grooved surface, of the anti-detachment collar 111. Each gullet 1112 is a groove with one open end, and the open end of the gullet 1112 faces towards the rim outer grooved surface. The inner diameter of the bottom of the gullets 1112 is smaller than the diameter of the first tire bead seat 112. The diameter of the first protruding ring 113 is smaller than the outside diameter of the protruding teeth 1111.

In an embodiment, referring to FIG. 3, a second protruding ring 115, a third protruding ring 116 and a grooved ring 118 arranged between the second protruding ring 115 and the third protruding ring 116 are provided on the rim outer grooved surface.

The second protruding ring 115 is adjacent to the anti-detachment collar. The second protruding ring 115 is smoothly connected to the anti-detachment collar via a first transition ring 117, and the first transition ring 117 is a sloped ring. The diameter of the second protruding ring 115 is smaller than the inner diameter of the bottom of the gullets 1112.

The third protruding ring 116 is adjacent to the first protruding ring 113, and the third protruding ring 116 is a sloped ring. The first protruding ring 113 is smoothly connected to the grooved ring 118 via the third protruding ring 116, and the diameter of the first protruding ring 113 is greater than the maximum diameter of the grooved ring 118.

The grooved ring 118 includes a second transition ring 1181 and a third transition ring 1182. The second transition ring 1181 and the third transition ring 1182 are sloped rings. The junction between the second transition ring 1181 and the third transition ring 1182 forms the minimum diameter of the grooved ring 118.

In an embodiment, the maximum diameter of the second transition ring 1181 is equal to the maximum diameter of the third transition ring 1182.

In an embodiment, the junction between the second transition ring 1181 and the third transition ring 1182 is located on the centerline of the nominal width of the rim body 1.

In an embodiment, the outside diameter of the first wheel flange 123 is equal to the outside diameter of the second wheel flange 131, and the outside diameter of the protruding teeth 1111 is smaller than the outside diameter of the first wheel flange 123.

Figure 4:
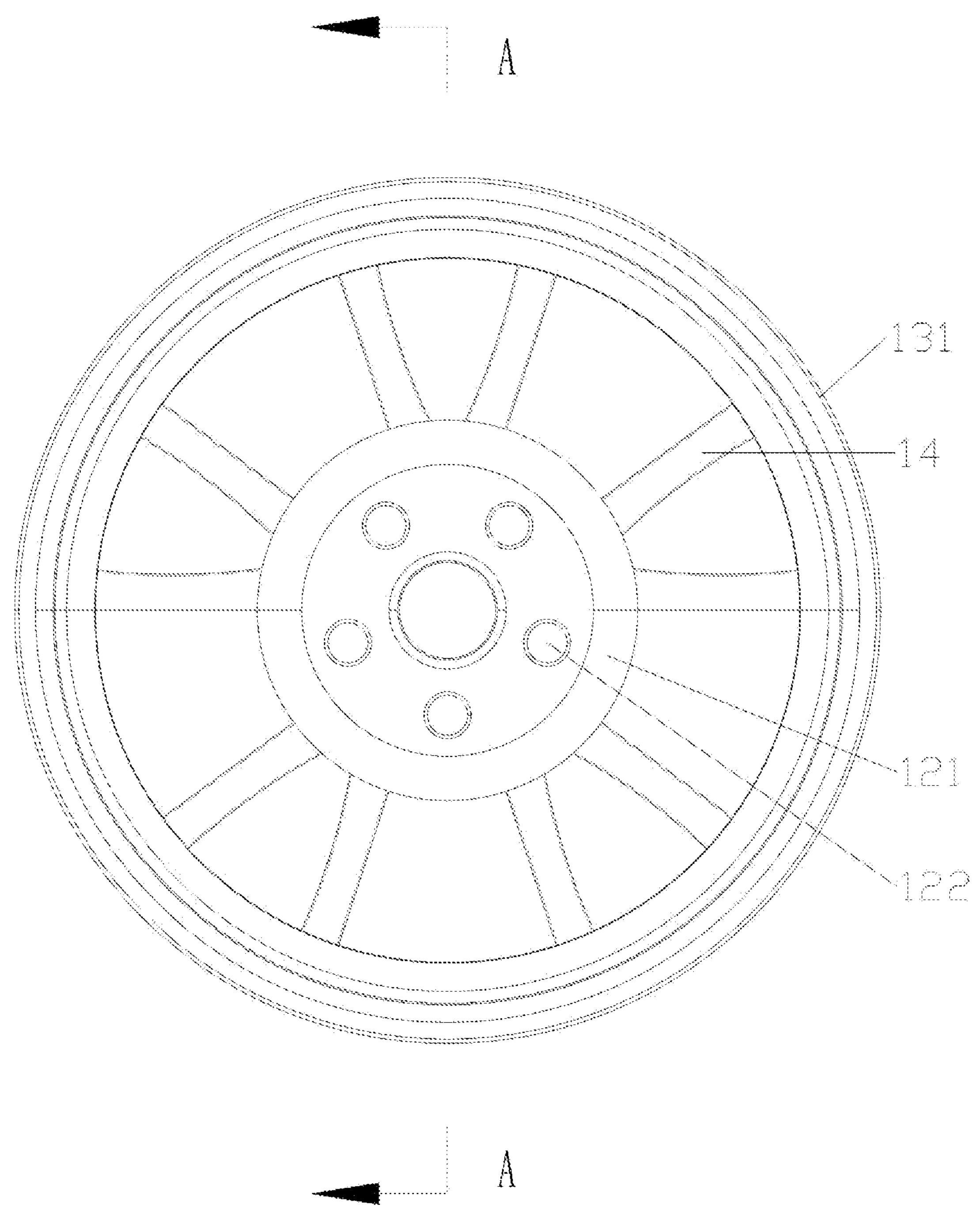
FIG. 4 is a schematic rear view of the safety wheel against tire burst according to an embodiment of the present application.
Figure 6:
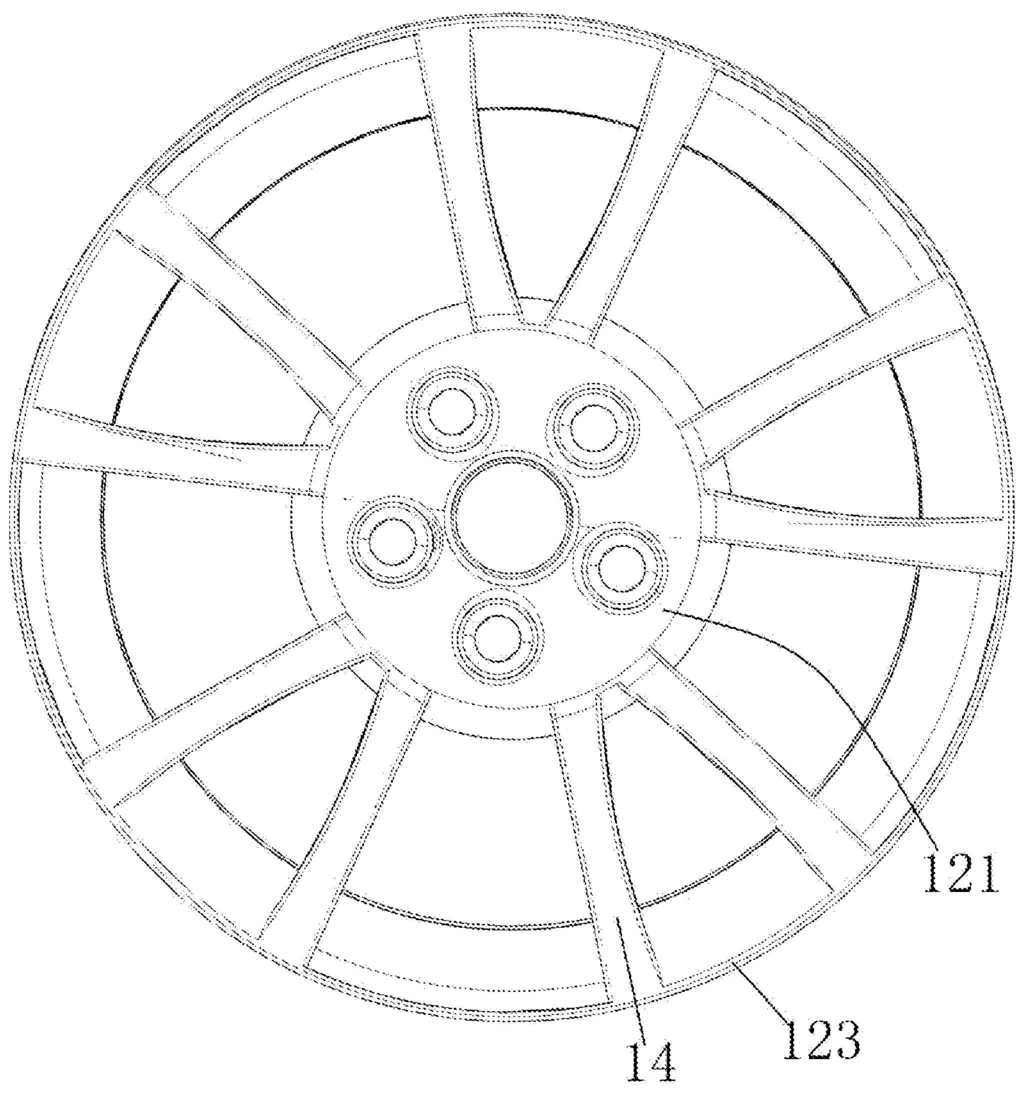
FIG. 6 is a schematic front view of the safety wheel against tire burst according to an embodiment of the present application.

In an embodiment, referring to FIG. 4 and FIG. 6, the rim body 1 includes multiple spokes 14 radially arranged on the first side surface 12. The connecting seat 121 adapted to the automobile half shaft is formed at the center of the multiple spokes 14, and multiple mounting through holes 122 are defined on the connecting seat 121. The spokes 14 are strip-shaped. One end of each spoke 14 is connected with the connecting seat 121, and the other end of each spoke 14 is connected with the first wheel flange 123.

It can be seen from the above description that, the safety wheel against tire burst according to the present application is provided with an anti-detachment collar 111, and the anti-detachment collar 111 is provided with a toothed structure which can lock the tire so that the tire can rotate following the rim. The toothed structure includes multiple protruding teeth 1111 and gullets 1112 which are alternately arranged. The outside diameter of the protruding teeth 1111 is greater than the diameter of the tire bead of the tire adapted to the tire mounting seat. If the tire with the safety wheel against tire burst according to the present application is burst, the tire bead of the tire (which may be a rubber tire) will fall directly from the first tire bead seat 112 to the anti-detachment collar 111. The protruding teeth 1111 on the anti-detachment collar 111 can lock the tire, and support the tire bead of the tire, so that the burst tire can continue to rotate following the rim, which greatly reduces the difference in rotation traveling distance between the left and right wheels and reduces the amplitude of deviation of the automobile. Therefore, the automobile can maintain its direction under tire burst, and the driver is allowed to slow down and brake calmly, thereby effectively avoiding various problems caused by the tire burst during high-speed traveling, reducing the incidence of accidents caused by the tire burst of the automobile, and protecting the safety of drivers and passengers.

Second Embodiment

The safety wheel against tire burst according to this embodiment of the present application includes a rim body 1. The rim body 1 has an outer annular surface 11, a first side surface 12 and a second side surface 13. The first side surface 12 and the second side surface 13 are oppositely arranged on two sides of the outer annular surface 11. The two sides of the outer annular surface 11 of the rim body 1 are oppositely provided with a first wheel flange 123 and a second wheel flange 131. The first wheel flange 123 is located on the first side surface 12, and the second wheel flange 131 is located on the second side surface 13. A tire mounting seat is formed between the first wheel flange 123 and the second wheel flange 131, and an anti-detachment collar 111 is provided on the tire mounting seat. Different from the safety wheel against tire burst in the first embodiment, the anti-detachment collar 111 in this embodiment is close to the second wheel flange 131, and a mounting seat for mounting the tire bead on one side of the tire is formed between the anti-detachment collar 111 and the second wheel flange 131. The diameter of the mounting seat for mounting the tire bead on one side of the tire is smaller than the diameter of the surface of the anti-detachment collar 111.

Third Embodiment

The safety wheel against tire burst according to this embodiment of the present application includes a rim body 1. The rim body 1 has an outer annular surface 11, a first side surface 12 and a second side surface 13. The first side surface 12 and the second side surface 13 are oppositely arranged on two sides of the outer annular surface 11. The two sides of the outer annular surface 11 of the rim body 1 are oppositely provided with a first wheel flange 123 and a second wheel flange 131. The first wheel flange 123 is located on the first side surface 12, and the second wheel flange 131 is located on the second side surface 13. A tire mounting seat is formed between the first wheel flange 123 and the second wheel flange 131, and an anti-detachment collar 111 is provided on the tire mounting seat.

Different from the safety wheel against tire burst in the first embodiment and the second embodiment, the safety wheel against tire burst in this embodiment has two oppositely arranged anti-detachment collars, namely first anti-detachment collar and second anti-detachment collar. The first anti-detachment collar is close to the first wheel flange, and a first mounting seat for mounting the tire bead on one side of the tire is formed between the first anti-detachment collar and the first wheel flange. The second anti-detachment collar is close to the second wheel flange, and a second mounting seat for mounting the tire bead on the other side of the tire is formed between the second anti-detachment collar and the second wheel flange. The diameter of the mounting seat for mounting the tire bead of the tire is smaller than the diameter of the surface of the anti-detachment collar.

In summary, the safety wheel against tire burst according to the present application can support and lock the tire by means of the anti-detachment collar arranged thereon, so that the burst tire can continue to rotate following the rim, which greatly reduces the difference in rotation traveling distance between the left and right wheels and reduces the amplitude of deviation of the automobile.

The technical features in the foregoing embodiments may be combined at will (as long as there is no contradiction in the combination of these technical features). For conciseness of description, all possible combinations of the technical features of the foregoing embodiments are not described. However, these embodiments not explicitly disclosed herein shall also be considered as falling within the scope of this specification.

The present application has been described in detail through general description and specific embodiments. It should be understood that based on the technical concept of the present application, some routine adjustments or further innovations can be made to these specific embodiments. However, the technical solutions obtained by these routine adjustments or further innovations also fall within the scope of protection of the claims of the present application, as long as they do not depart from the technical concept of the present application.

What is claimed is:

1. A safety wheel against tire burst, comprising a rim body, wherein the rim body comprises an outer annular surface, a first side surface and a second side surface, wherein the first side surface and the second side surface are oppositely arranged on two sides of the outer annular surface, wherein a through hole for an automobile half shaft to pass through is defined on the second side surface, and a connecting seat adapted to the automobile half shaft is formed on the first side surface;

the two sides of the outer annular surface are oppositely provided with a first wheel flange and a second wheel flange, wherein a tire mounting seat is formed between the first wheel flange and the second wheel flange, and an anti-detachment collar is provided on the tire mounting seat, wherein the anti-detachment collar is an annular protruding ring arranged along the outer annular surface, wherein the anti-detachment collar is concentric with the outer annular surface, wherein a surface of the anti-detachment collar is provided with a toothed structure which comprises a plurality of protruding teeth and gullets, wherein the protruding teeth and the gullets are alternately arranged, the protruding teeth are protrusions extending outward from the surface of the anti-detachment collar, and the gullets are grooves recessed inward from the surface of the anti-detachment collar, wherein an outside diameter of the protruding teeth is greater than a diameter of a tire bead adapted to be placed in the tire mounting seat, wherein the first wheel flange is located on the first side surface, the second wheel flange is located on the second side surface, and the automobile half shaft is directed through the second side surface and connected with the center of the first side surface;

the anti-detachment collar is close to the first wheel flange, a first tire bead seat is formed between the anti-detachment collar and the first wheel flange, and a diameter of the first tire bead seat is smaller than a diameter of the surface of the anti-detachment collar;

a first protruding ring is provided on the outer annular surface of the rim body, wherein the first protruding ring is close to the second wheel flange, and a second tire bead seat is formed between the first protruding ring and the second wheel flange, wherein the first tire bead seat and the second tire bead seat are symmetrically arranged with a centerline of a nominal width of the rim body as a symmetry axis, wherein a diameter of the first tire bead seat is equal to a diameter of the second tire bead seat; and a rim outer grooved surface is formed between the first protruding ring and the anti-detachment collar, wherein the protruding teeth are arranged on a side, close to the rim outer grooved surface, of the anti-detachment collar, wherein each gullet is a groove with one open end, and the open end of the gullet faces towards the rim outer grooved surface;

an inner diameter of the bottom of the gullets is smaller than the diameter of the first tire bead seat; and the plurality of protruding teeth and the gullets are uniformly arranged on the surface of the anti-detachment collar.

2. The safety wheel against tire burst according to claim 1, wherein the anti-detachment collar is close to the second wheel flange, and a mounting seat for mounting the tire bead on one side of the tire is formed between the anti-detachment collar and the second wheel flange, wherein a diameter of the mounting seat for mounting the tire bead on one side of the tire is smaller than the diameter of the surface of the anti-detachment collar.

3. The safety wheel against tire burst according to claim 1, wherein two anti-detachment collars, namely first anti-detachment collar and second anti-detachment collar, are oppositely provided on the tire mounting seat, wherein the first anti-detachment collar is close to the first wheel flange, and a first mounting seat for mounting the tire bead on one side of the tire is formed between the first anti-detachment collar and the first wheel flange; the second anti-detachment collar is close to the second wheel flange, and a second mounting seat for mounting the tire bead on the other side of the tire is formed between the second anti-detachment collar and the second wheel flange.

4. The safety wheel against tire burst according to claim 1, wherein a second protruding ring, a third protruding ring and a grooved ring arranged between the second protruding ring and the third protruding ring are provided on the rim outer grooved surface, wherein the second protruding ring is adjacent to the anti-detachment collar, wherein the second protruding ring is smoothly connected to the anti-detachment collar via a first transition ring, and the first transition ring is a sloped ring, wherein a diameter of the second protruding ring is smaller than the inner diameter of the bottom of the gullets; and the third protruding ring is adjacent to the first protruding ring, and the third protruding ring is a sloped ring, wherein the first protruding ring is smoothly connected to the grooved ring via the third protruding ring, and the diameter of the first protruding ring is greater than a maximum diameter of the grooved ring.

5. The safety wheel against tire burst according to claim 4, wherein the grooved ring comprises a second transition ring and a third transition ring, wherein the second transition ring and the third transition ring are sloped rings, a junction between the second transition ring and the third transition ring forms the minimum diameter of the grooved ring, and a maximum diameter of the second transition ring is equal to a maximum diameter of the third transition ring; and the junction between the second transition ring and the third transition ring is located on the centerline of the nominal width of the rim body.

6. The safety wheel against tire burst according to claim 1, wherein an outside diameter of the first wheel flange is equal to an outside diameter of the second wheel flange, and the outside diameter of the protruding teeth is smaller than the outside diameter of the first wheel flange.

7. The safety wheel against tire burst according to claim 1, wherein the rim body comprises a plurality of spokes radially arranged on the first side surface, wherein the connecting seat adapted to the automobile half shaft is formed at the center of the plurality of spokes, and a plurality of mounting through holes are defined on the connecting seat; and the plurality of spokes are strip-shaped, one end of each spoke is connected with the connecting seat, and the other end of each spoke is connected with the first wheel flange.

* * * * *